Figure 1:
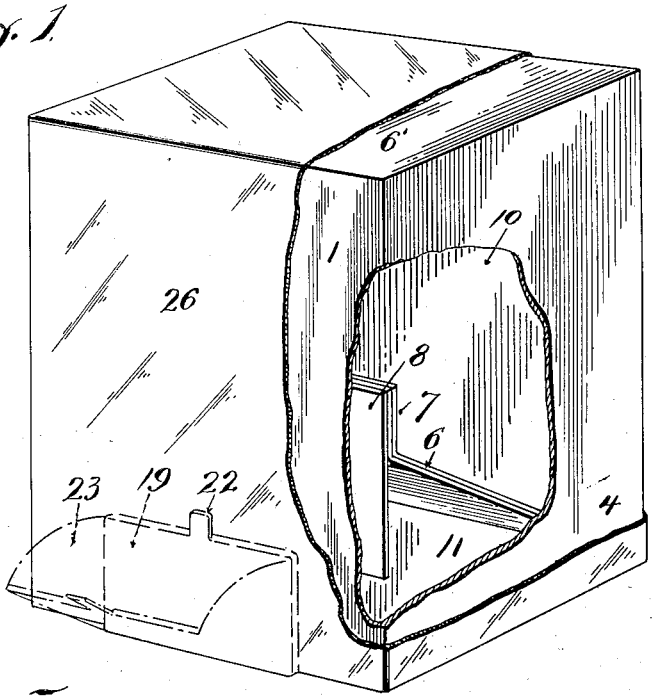

Jan. 15, 1935. G. F. WIEMANN 1,988,064
RECEPTACLE
Filed Oct. 27, 1931   2 Sheets-Sheet 1

INVENTOR
George F. Wiemann
BY
Charles G. Hensley
ATTORNEY

Jan. 15, 1935. G. F. WIEMANN 1,988,064
RECEPTACLE
Filed Oct. 27, 1931 2 Sheets-Sheet 2
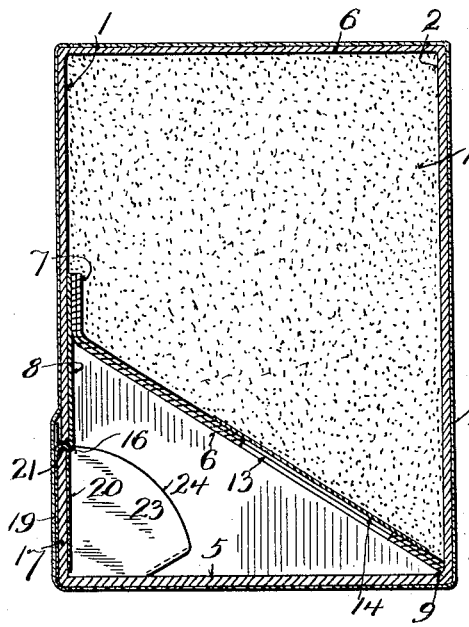
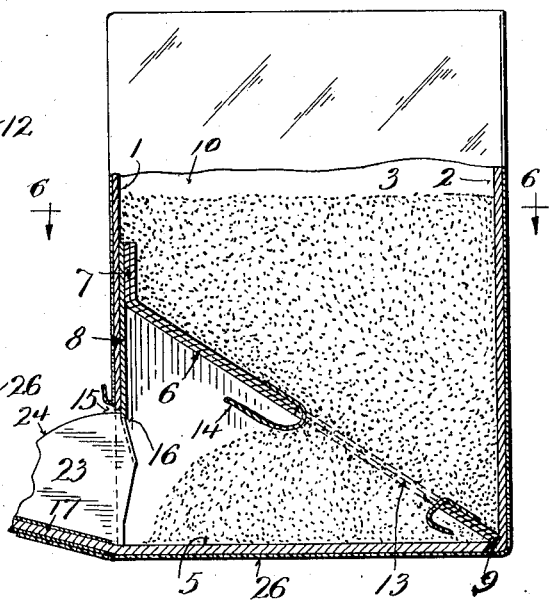
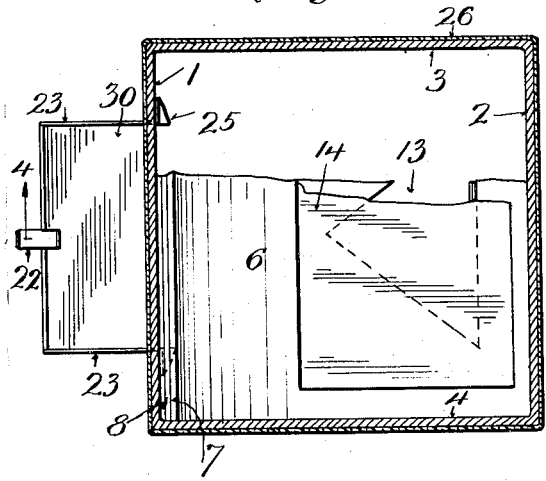
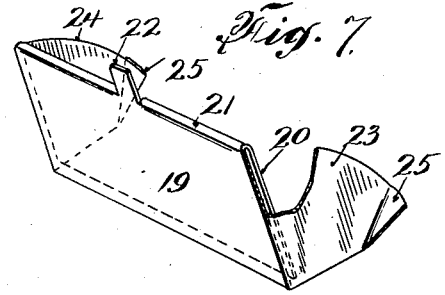
INVENTOR
George F. Wiemann
BY Charles G. Hensley
ATTORNEY Patented Jan. 15, 1935

1,988,064

UNITED STATES PATENT OFFICE 1,988,064

RECEPTACLE

George F. Wiemann, Manhassett, N. Y.

Application October 27, 1931, Serial No. 571,312

4 Claims. (Cl. 229—7)

The present invention relates to receptacles and while it may be employed as a container for various food products and even various other materials, it is especially useful as a container for coffee and I will describe the invention as applied to this use without, however, intending to limit the scope of my invention thereto.

It is common practice at the present time to market coffee under two general methods. One is to market the coffee in bulk; that is, in large bags; and the retailer empties the contents of the bag or a substantial part of its contents into a metal store or counter box having a hinged door or spout near the bottom which is adapted to be opened to permit a scoop to be inserted to withdraw the coffee for weighing and packing in paper bags.

The other method is to pack the coffee at the factory or roasting station into pound or other individual boxes which are sealed; or else the coffee is packed in small quantities, say one pound, in vacuum cans, and these original cans or boxes are sold over the counter by the retailer in sealed condition.

Under the second method the coffee is protected against dirt and the consumer is assured of receiving the brand of coffee designated by the label on the individual package. On the other hand, this method of packing increases the cost of the product by about seven cents a pound, which the ultimate consumer must necessarily pay for.

The object of my present invention is to provide a container which will hold coffee in bulk, i. e., a greater quantity than is ordinarily sold at one time to a consumer, so that the cost of packing is much less than where the coffee is packed in individual pound packages. The present container, however, protects the larger quantity of coffee against dirt as thoroughly as the coffee which is packed in pound containers and it also may be sealed so that it protects the coffee against moisture and preserves its aroma and freshness equally as well as the small containers. The present package also insures the delivery of the coffee to the retailer under its authentic label or trademark and it permits the retailer to sell the coffee from the original container in any desired quantity, to the consumer.

The receptacle, therefore, forming the subject of my invention, is an original container adapted to contain a supply of coffee until its distribution to the retailer; and it is provided with simple and inexpensive means by which the retailer may break the seal in the container and take any desired quantities from the package for weighing and packing in individual bags to suit the demands of the consumer.

It is intended that the present receptacle not only shall serve as an original package but it may be set up in a retail store and the coffee sold from it in substantially the same manner as coffee is sold in the ordinary store sales can. However, the present receptacle is more sanitary in that it is disposed of after its original contents have been fully dispensed, whereas the ordinary store receptacle is repeatedly refilled from the bulk package and in many cases the receptacle is not cleaned out but fresh coffee is simply added to replenish the supply from time to time.

The present package may, therefore, be used as an original container and it may be hermetically sealed such as by an enclosing wrapper of cellophane to protect the contents from dust and moisture and to preserve the aroma until the package reaches the retailer. The retailer may set the package up on a counter or bench where the consumer can see the original label of the package and thus be assured that the brand of coffee is the brand indicated by the label.

There is a front door near the lower portion of the receptacle, which is adapted to open up the lower portion of a scoop compartment so that the retailer may insert an ordinary hand scoop into this compartment for the purpose of removing a part of the coffee to place it in a scale for weighing out whatever quantity is desired by the consumer. Any excess taken out in the scoop may be readily returned through the door to the compartment referred to. The door, which is of the swinging variety, is provided with a suitable guard so that the sides of the door opening are shielded to prevent coffee being scattered as the scoop is inserted into and withdrawn from the receptacle.

This door, in fact, serves the same purpose as the ordinary door of the metal containers ordinarily used in stores for distributing bulk coffee. The guard member for the movable door is very simple and inexpensive in its construction, being blanked and folded from sheet metal so that the cost thereof is very low and adds but slightly to the cost of the receptacle.

In the preferred construction this door guard member is made detachable so that when the contents of the container have been entirely disposed of, the guard member may be removed from the door and applied to the door of another receptacle.

In this way a single guard may be used repeatedly so that all the original packages furnished to a retailer do not necessarily have to be supplied with the guard because a single guard may serve for a number of receptacles. In this manner the cost of the guard may be distributed over a number of receptacles. Other advantages will be apparent from the following detailed description of my invention.

Figure 3:
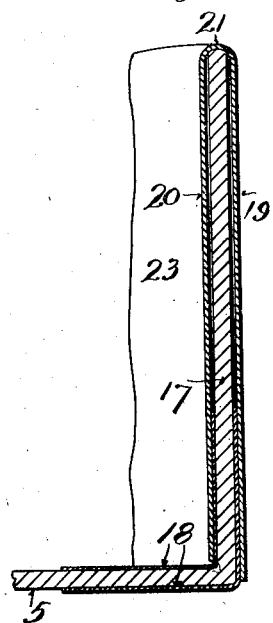
Figure 2:
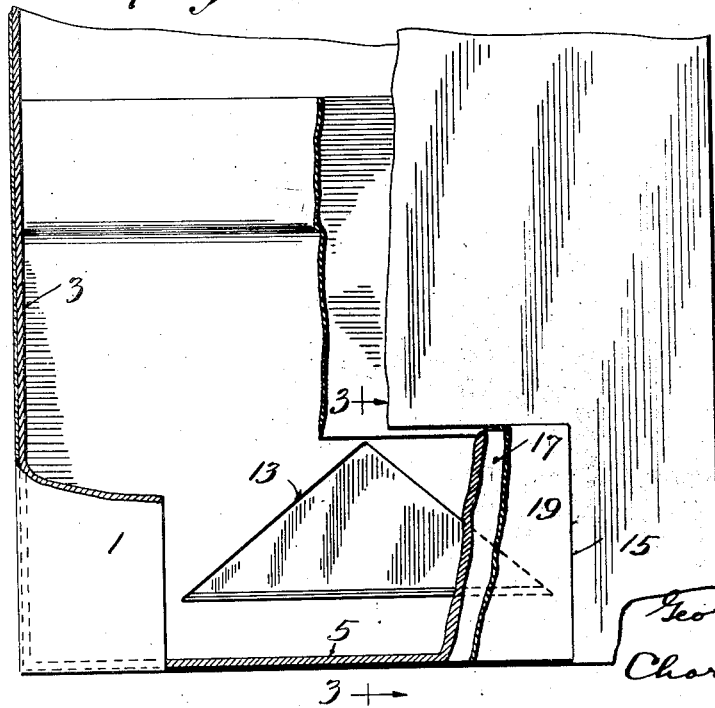

In the drawings forming part of this application,

Figure 1 is a perspective view of a container embodying my invention, with parts broken away to show the interior, Figure 2 is a front elevation with parts broken away to show the interior, Figure 3 is a sectional view taken on the line 3—3 of Figure 2, the parts being shown on an enlarged scale, Figure 4 is a sectional view taken on the line 4—4 of Figure 6, Figure 5 is an elevation, with parts broken away, substantially on the same line as Figure 4 but showing the receptacle after the seal has been broken and the contents have partly flowed into the scoop compartment, Figure 6 is a sectional view taken on the line 6—6 of Figure 5, and Figure 7 is a perspective view of the guard member with a part broken away to show the details of construction.

The receptacle embodying my invention may be made of any dimensions and of any kind of material. I have illustrated it as a box made of cardboard and of sufficient dimensions to hold a quantity of coffee greater than is ordinarily sold to a single customer or, in other words, to hold coffee in bulk.

This container is shown in rectangular form and consists of front and back walls 1, 2, side walls 3, 4, a top wall 6 and a bottom wall 5. The interior of the receptacle is divided by an angularly disposed partition 6 which I have shown as formed of a plurality of thicknesses of cardboard glued together, the upper end of which is bent as shown at 7 and glued or otherwise secured against the front wall 1 of the receptacle and inside the latter.

Preferably, there is a reinforcing member 8 also glued to the front wall of the receptacle inside the latter and the upper, bent end of the dividing wall is secured to this reinforcing member, the latter being glued against the inner surface of the front wall 1. The dividing wall is inclined downwardly from the front wall and its lower edge is shown as fitting into the angle where the rear wall 2 and the bottom wall 5 meet at the rear of the receptacle, as shown at 9. This partition, therefore, divides the interior of the receptacle into an upper compartment 10 which receives and holds the original supply of coffee or other material, as shown at 12, and a lower or scoop compartment 11 disposed below the partition. The partition is provided with an opening or cut-out 13 which is shown in the drawings as of triangular shape, although any other shaped opening will serve the purpose.

This opening is adapted to be closed during the transportation of the receptacle and until it is set up for dispensing the contents, by means of a breakable sealing member 14 which may consist of a piece of stout paper glued to the upper side of the dividing wall 6 and entirely covering the opening 13.

The front wall of the receptacle is provided near the bottom with an opening 15 which I have shown as rectangular in shape and conforming substantially with the shape and size of the door.

Preferably this opening extends down to the bottom wall of the receptacle, as shown in Figures 4 and 5. The bottom edge of the reinforcing piece 8 extends slightly below the upper edge of the opening 15 to form an abutment 16 for the upper end of the door to hold the same flush with the front wall of the receptacle when the door is in closed position.

The door 17 is preferably formed from the material cut from the front wall of the receptacle in forming the opening 15 and preferably the material of which the door is formed remains connected with the bottom wall 5 of the receptacle. Suitable reinforcing patches 18 may be pasted partly across the lower edge of the door and the front of the bottom wall, both against the inner and outer surfaces, to reinforce the material along the hinge line of the door. This door, which conforms to the contour of the edges of the opening 15 in the front wall is adapted to close this opening when the door is in closed position.

The guard for supporting the door in the open position and for preventing the escape of the coffee at the sides of the door while it is being removed from the compartment 11 is shown in Figure 7 detached from the door. It consists preferably of a metal sheet blanked and folded upon itself to provide a front wall 19 and a parallel back wall 20 the walls being connected at the top or at the bend 21. I have shown a handle 22 for manipulating the door, the handle being formed by cutting a portion of the wall 20 and bending the handle upwardly therefrom so that it is in position to lie close to or against the front wall of the receptacle when the door is closed. The guard member has two side walls or wings 23 one at each end of the guard member, which are shown as continuous with the front wall 19.

These guard members extend rearwardly or at right-angles to the wall 19 and the upper edges 24 are shown curved on arcs concentric with the hinge of the door. The inner ends or corners of these guards are bent at right angles as shown at 25 to provide stops adapted to engage against the inner side of the front wall of the receptacle to limit the swing of the door to hold the latter in the desired inclination suitable for the operations hereinafter described.

The guard member may be applied to the door when the latter is open, by sliding it downwardly in the plane of the door, so that the two walls 19, 20 straddle the door and engage against the inner and outer surfaces thereof, the guard being pressed downwardly in relation to the door until the upper looped edge 21 seats against the top edge of the door. The friction of the inner and outer walls 19, 20 against the door will suffice to keep the guard member in assembled position thereon.

The guard member is applied to the door when the latter is swung down quite low or even in the plane of the bottom wall 5 so that it is slipped onto the door while the side plates 23 lie exterior to the receptacle. After the guard has been applied to the door the guard and door are swung upwardly or toward the plane of the front wall of the receptacle and the free ends of the guard members 23 are pressed inwardly toward each other until the stop members 25 are pressed through the opening 15 and into the interior of the compartment 11, whereupon these members are released and their own resiliency causes them to spring outwardly again so that the members 23 press lightly against the lateral edges of the opening 15 of the front wall and the stop members 25 are in position to engage with the front wall of the receptacle adjacent the opening 15.

The entire receptacle, including the front door, may be enclosed by a sealed wrapper 26 of cellophane or similar material which will hermetically seal the entire receptacle and its contents and at the same time permit any label or brand marks to be seen through the same.

The receptacle as put up at the factory will be as shown in Figures 1 and 4. The compartment 10 which is the larger compartment of the container is filled with coffee 12 or other material, the same being confined between the several walls of the receptacle and the inclined dividing wall 6. The sealing member 14 covers the aperture 13 in the dividing wall so that all of the coffee is contained within the compartment 10 where it remains until the receptacle is set up for dispensing the coffee in the retail store. The door 17 is closed and the portions 23 of the guard remain within the compartment 11.

Paper bags (not shown) may be stored in this compartment to be used by the retailer when weighing out the coffee for sale, that is to say, a supply of paper bags having the original trademark, may be packed in this compartment so that the retailer may use these to deliver the coffee to the consumer. Such bags would naturally be all removed from this compartment when the receptacle is set up, ready for use. The entire package being enclosed in the cellophane wrapper, the contents will be protected against dirt as well as against moisture, just as effectively as are the contents of the smaller factory packed receptacles. However, the receptacle being adapted to hold a quantity of coffee in bulk, the cost per pound of coffee for the receptacle is less than where coffee is packed in one pound or similar containers.

When the container reaches the retailer he may set it up on a counter or shelf in the position shown in Figures 1, 4 and 5 so that the bottom wall rests on the counter or shelf, and the front door may be opened downwardly or toward the operator. The storekeeper will first cut the cellophane wrapper 26 around the outline of the door to permit the latter to be swung forwardly and downwardly to the position shown in Figure 5. When the door is in this position the stop members 25 rest against the inner surface of the front wall of the receptacle and support the door in this position, which is somewhat inclined in relation to the bottom wall of the receptacle. He may then reach in through the door opening 15 and break the sealing member 14 by forcing the hand through it, operating through the opening 13 of the dividing wall.

When the sealing member has been broken, the coffee within the compartment 10 will flow down through the opening 13 in the dividing wall and spread out into the scoop compartment 11 as shown in Figure 5. The operator may then take an ordinary hand scoop, pass it through the door opening and with it scoop up some of the coffee which has spread into the compartment 11. The scoop and its coffee are removed through the front opening 15 and it may be poured onto a scale for weighing.

It may be necessary to refill the scoop in the same manner and when the weighing operation is finished any coffee remaining in the scoop may be returned to the compartment 11 or merely poured on top of the door between the guard members 23. While the scoop is being used to remove or to return coffee in relation to the compartment 11 the coffee is prevented from spilling both by the door and by the side guards 23 which temporarily form an exterior chamber 30.

When the dispensing or weighing operation has been completed the operator merely pushes the door back into the position shown in Figure 4, whereupon the front opening will be closed by the door and any coffee which was in the exterior compartment 30 is pushed back into the compartment 11 and the receptacle remains entirely closed until the next dispensing operation.

These dispensing operations may be repeated from time to time and as the coffee is removed from the lower compartment 11 additional coffee flows down through the opening 13 in the dividing wall to replace the coffee which has been removed from the lower compartment. These operations will be carried on until the entire upper compartment has been emptied and still further until the lower compartment has also been emptied.

When the entire receptacle has been emptied of its contents, it may be thrown away or discarded as it is not intended that it be used again. However, the guard member may be removed from the door before the receptacle is discarded. This may be done by simply opening the door and at the same time pressing the guard members 23 inwardly until the stop members 25 pass through the opening 15.

The guard member may be then slid off the top of the door in the opposite way to which it was applied. This guard may then be attached to the door of another receptacle to be used in conjunction therewith in the same manner as with the first receptacle. The guard being made of metal, it may be used over and over again so that where a number of receptacles are shipped to the same retailer one guard may suffice for a number of receptacles.

In that case, the receptacles which are not primarily supplied with a guard will be provided with a door and the front opening the same as described above, ready to have the guard member transposed from one receptacle to another as occasion requires.

It will be noted that the only additional cost of the present receptacle over a plain one for bulk coffee is the cost of supplying the dividing wall and the guard. The cost of the dividing wall is almost nominal. The cost of the guard is very low when made of stamped metal and if the practice is followed of transferring the guard from one receptacle to another, the cost of the guard is almost negligible.

It will be apparent that I have provided a container for handling coffee in bulk up to the time it reaches the retailer and that the retailer may dispense the coffee from the original container so that the consumer may observe the label on the original package and be assured of the brand of coffee which he or she has purchased. The present receptacle combines all of the advantages of the bulk package together with the advantages of the small individual, sealed packages.

The cost of packing coffee in the present receptacle, however, is considerably less than where it is packed in the small individual packages and the retailer may, therefore, sell the product at the same price per pound as coffee furnished to the retailer in bulk.

I do not wish to limit my invention to the exact details of construction here shown and described but to include all modifications and changes which come within the scope of the following claims.

Having described my invention, what I claim is:

1. A shipping container for loose products, including a receptacle having an opening, a door for closing said opening, a member secured to the inner side of said receptacle and projecting partly across said door opening to form a stop for said door, a dividing wall disposed in the receptacle and having one end secured against said inner member and having one end secured in one of the meeting angles of the walls of said receptacle, said dividing wall serving to divide the receptacle into a relatively large and a relatively small compartment, said door being disposed to give access to said smaller compartment, and means adapted to permit an opening to be formed in said dividing wall whereby the material may flow from the larger to the smaller compartment.

2. A receptacle having a door opening, a pivotal door for closing said opening, a guard member including a plate bent into U shape to provide walls for slidably engaging opposite faces of said door and with a loop which connects said walls, engaging the upper edge of the door, said guard having plates extending laterally from one of said guard walls and projecting through the door opening to provide means for closing the spaces between the ends of said door and the adjacent wall of the receptacle when the door is in open position.

3. As an article of manufacture, a guard member comprising a plate folded upon itself to form walls adapted to engage a door between them and be freely slid onto said door and integral plates extending laterally from said first plates to provide guards for closing the spaces between the ends of a door to which said device is attached and the adjacent wall of a receptacle on which said door is mounted.

4. A shipping container for loose material, including a receptacle having an opening and a door pivotally connected to said receptacle for closing said opening, and a guard member having plate members bent into U shape to straddle said door whereby one of the plate portions engages the outer face of said door and the other the inner face of said door, so that said guard member may be readily slid off said door, said guard member having guard plates for closing the spaces between the ends of said door and the adjacent wall of the receptacle when the door is in open position.

GEO. F. WIEMANN.